(12) United States Patent
Loeppert et al.

(10) Patent No.: US 8,457,332 B2
(45) Date of Patent: Jun. 4, 2013

(54) MICROPHONE AND ORIENTATION SENSOR ASSEMBLY

(75) Inventors: Peter Loeppert, Hoffmann Estates, IL (US); Peter Smith, Naperville, IL (US); Eric Lautenschlager, Geneva, IL (US)

(73) Assignee: Knowles Electronics, LLC, Itasca, IL (US)

( * ) Notice: Subject to any disclaimer, the term of this patent is extended or adjusted under 35 U.S.C. 154(b) by 821 days.

(21) Appl. No.: 12/652,793

(22) Filed: Jan. 6, 2010

(65) Prior Publication Data

US 2010/0172518 A1 Jul. 8, 2010

Related U.S. Application Data

(60) Provisional application No. 61/143,069, filed on Jan. 7, 2009.

(51) Int. Cl.
*H04R 3/00* (2006.01)

(52) U.S. Cl.
USPC .......................................... 381/175; 381/122

(58) Field of Classification Search
USPC .................... 381/122, 174–176, 191, 369
See application file for complete search history.

(56) References Cited

U.S. PATENT DOCUMENTS

| | | | |
|---|---|---|---|
| 4,503,715 A | 3/1985 | Greenwood | |
| 6,535,460 B2 * | 3/2003 | Loeppert et al. | 367/181 |
| 8,309,386 B2 * | 11/2012 | Weigold | 438/53 |
| 8,325,951 B2 * | 12/2012 | Wang | 381/175 |
| 8,368,153 B2 * | 2/2013 | Huang et al. | 257/416 |
| 2006/0094480 A1 | 5/2006 | Tanaka | |
| 2006/0156818 A1 | 7/2006 | Kasper et al. | |
| 2010/0172518 A1 * | 7/2010 | Loeppert et al. | 381/122 |

FOREIGN PATENT DOCUMENTS

| | | |
|---|---|---|
| KR | 10-1991-0001366 A | 1/1991 |
| KR | 10-1998-0016188 A | 5/1998 |
| WO | 2008-043831 A1 | 4/2008 |

OTHER PUBLICATIONS

International Search Report for PCT/US2010/020243, dated Aug. 23, 2010.

* cited by examiner

*Primary Examiner* — Yaritza Guadalupe-McCall
(74) *Attorney, Agent, or Firm* — Fitch, Even, Tabin & Flannery, LLP

(57) ABSTRACT

A microphone and orientation sensor system includes a microphone and an orientation sensor. The microphone has a diaphragm. The orientation sensor includes an inertial load member having a first end and a second end opposite the first end. The sensor also includes at least one electrode positioned adjacent to the inertial load member. The sensor further includes a beam. The inertial load member pivots about the beam, and the pivoting of the load member causes a change in a distance between the first end and the electrode resulting in a change in capacitance between the first end and the electrode. The diaphragm and electrode are formed from a common layer of material.

12 Claims, 5 Drawing Sheets

MICROPHONE AND ORIENTATION SENSOR ASSEMBLY

CROSS REFERENCES TO RELATED APPLICATIONS

This application claims priority from U.S. provisional application Ser. No. 61/143,069 filed on Jan. 7, 2009, the contents of which are incorporated herein by reference in their entirety.

TECHNICAL FIELD

This patent relates to an assembly which includes at least one or more microphones and at least one or more orientation sensors.

BACKGROUND OF THE INVENTION

Various types of microphones have been used in consumer electronics, including condenser microphones and MEMS microphones. In addition, tilt or orientation sensors have recently seen various implementations in consumer electronic devices. These tilt sensors are capacitive devices which are low resolution accelerometers that respond to the force of gravity.

Accelerometers used as tilt or orientation sensors in the prior art have typically been surface micromachined Micro-ElectroMechanical System (MEMS) devices comprising thick layers of polysilicon, typically on the order of several microns, to form the inertial or moving mass member and associated electrodes. These types of designs are not generally compatible with the requirements for making a microphone, which requires a very sensitive membrane, typically with a thickness of 1 micron or less.

A capacitive microphone such as that disclosed in U.S. Pat. No. 6,535,460 to Loeppert et al (hereafter referred to as the '460 patent) discloses a diaphragm member typically made of polysilicon and a perforated backplate member which is a sandwich of polysilicon and silicon nitride layers. Integrating an accelerometer with a microphone such as that described in the '460 patent requires using the above-mentioned layers which comprise the microphone to create a capacitive structure that responds to gravity. Given the above-described structural incompatibility of accelerometer and microphone designs, this integration is not easily achieved.

It is an object of this invention to integrate at least one microphone and at least one orientation sensor together on a common substrate while satisfying the structural and functional requirements of both applications.

BRIEF DESCRIPTION OF THE DRAWINGS

For a more complete understanding of the disclosure, reference should be made to the following detailed description and accompanying drawings wherein.

Figure 1:
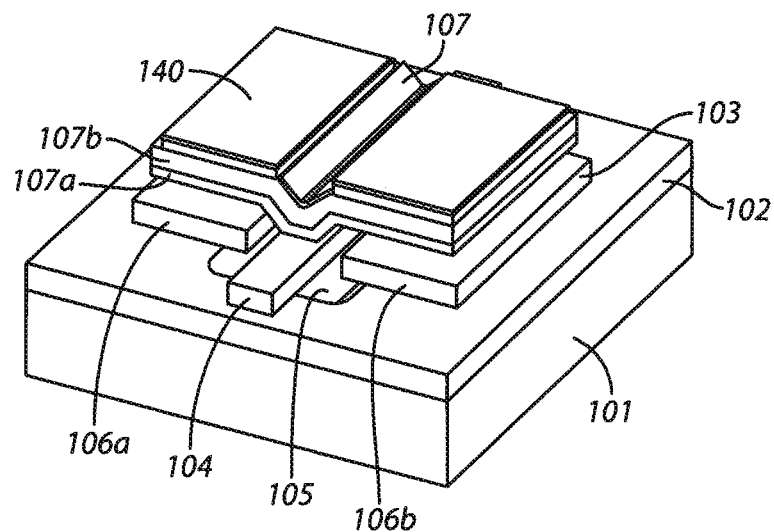
FIG. 1 illustrates a perspective view of an orientation sensor assembly according to the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

While the present disclosure is susceptible to various modifications and alternative forms, certain embodiments are shown by way of example in the drawings and these embodiments will be described in detail herein. It will be understood, however, that this disclosure is not intended to limit the invention to the particular forms described, but to the contrary, the invention is intended to cover all modifications, alternatives, and equivalents falling within the spirit and scope of the invention defined by the appended claims.

Turning to FIG. 1, a tilt or orientation sensor 100 is provided which may have a substrate 101 having a sacrificial oxide layer 102. A polysilicon layer 103 may be located on the sacrificial oxide layer 102. This layer 103 may correspond to the diaphragm layer of the microphone described in the '460 patent. The polysilicon layer 103 has, in an embodiment, two electrodes 106a, 106b and a beam 104. The beam 104 may be positioned over an opening 105 in the sacrificial oxide layer 102. The beam 104 supports an inertial mass member 107 which comprises layers of polysilicon 107a and silicon nitride 107b and corresponds to the perforated member of microphone '460. A second sacrificial oxide layer, not shown, serves to separate polysilicon layer 103 and the inertial mass member 107. The polysilicon layer 107a of inertial mass member 107 is adjacent to the electrodes 106a, 106b. The silicon nitride layer 107b adds mass and stiffness to inertial mass member 107.

Figure 2:
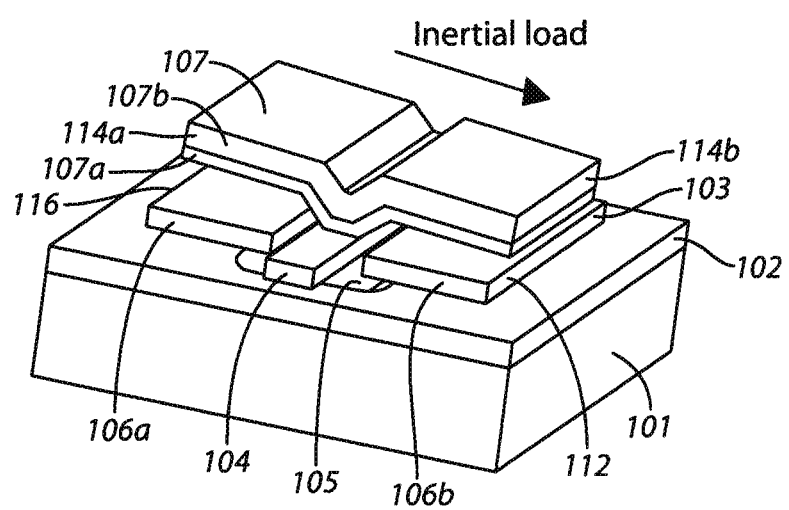
FIG. 2 illustrates a perspective view of the orientation sensor assembly of FIG. 1 under inertial load.

If the beam 104 and inertial mass member 107 are considered as a system, the beam 104 may provide a center of rotation or pivot point/area for the inertial mass member 107. The center of mass (not shown) of the beam 104 and inertial mass member 107 is offset from the center of rotation. Thus, the beam 104 torques under inertial load. This, in turn, causes the spacing between ends 114a, 114b of the inertial mass member 107 and the electrodes 106a, 106b to change: i.e., the spacing between one side increases while the other side decreases. FIG. 2 illustrates a specific example of an inertial load. A space or distance 116 between an end 114a of the inertial mass member 107 and the electrode 106a is larger than a space or distance 112 between an end 114b of the inertial mass member 107 and electrode 106b.

Figure 3:
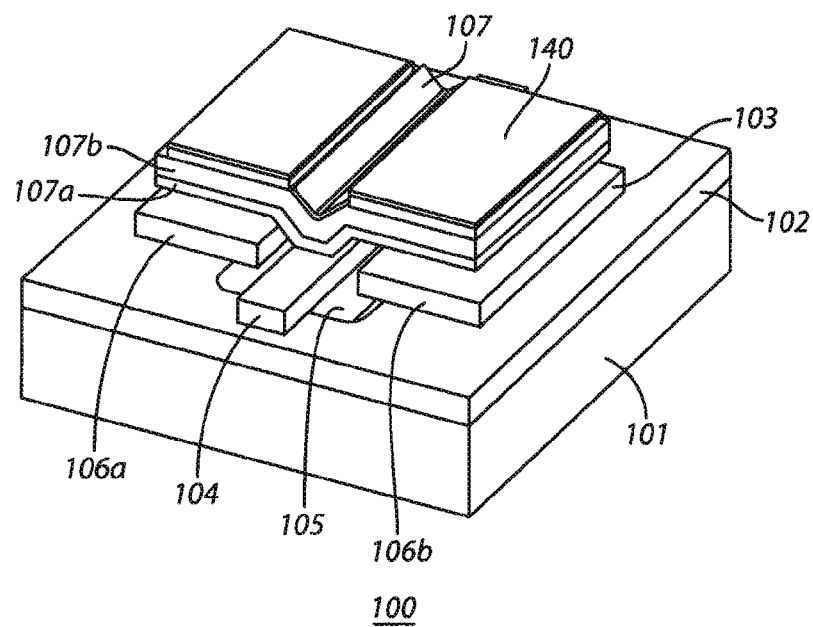
FIG. 3 illustrates a perspective view of an orientation sensor assembly in another embodiment of the present invention.

Sensitivity to inertial load can be increased by adding mass to the inertial mass member 107. A method for doing so is to add wire bond metallization 140 to the top of inertial mass member 107 as shown in FIG. 1. Creating an asymmetric inertial mass 107 about the beam 104 allows detection of inertial load in the axis perpendicular to the plane of the tilt sensor 100. Keeping the structure physically symmetric but adding the mass of wire bond metallization 140 to only one side of the inertial mass member 107 is preferred. In this way, the electrical signal derived from the capacitance formed between electrode 106a and inertial mass polysilicon layer 107a and the capacitance formed between electrode 106b and inertial mass polysilicon layer 107a is still fully balanced and asymmetrical electrostatic collapse may be avoided. The structure of FIG. 3 is sensitive to both inertial loads in the plane of the sensor 100 that are also perpendicular to the axis of rotation of beam 104, and to inertial loads perpendicular to the plane of the sensor 100. This cross-axis sensitivity can be resolved by processing the signals from two devices with their respective beams parallel but with one of the sensors having a symmetrical inertial mass member and the other sensor having an asymmetrical inertial mass member.

Figure 4:
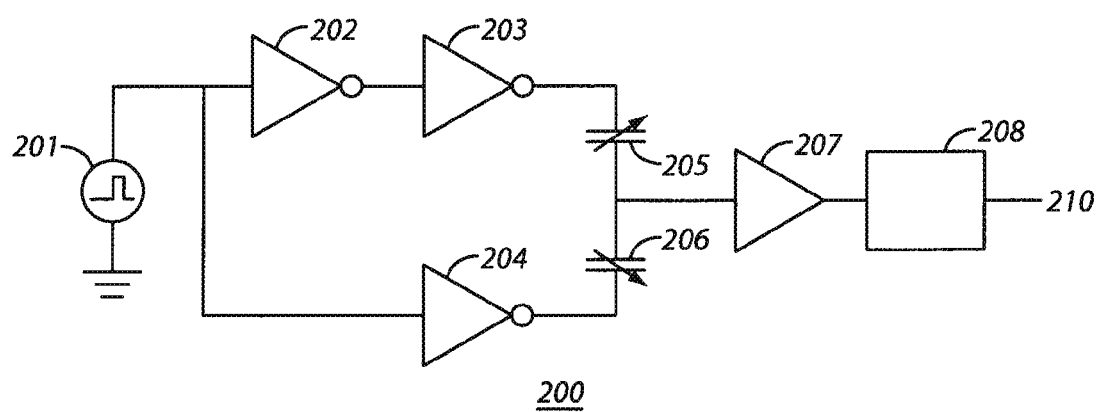
FIG. 4 is a schematic of an electronic circuit that can extract a signal proportional to the inertial load applied to the orientation sensor of FIG. 1 in an embodiment of the present invention.

FIG. 4 represents a schematic of an electronic circuit 200, in one embodiment, that can extract a signal proportional to the inertial load applied to tilt sensor 100. The circuit 200 may be integrated on substrate 101 with the sensor 100 or created as a separate integrated circuit (IC). A clock generator 201 may generate an approximately 50% duty cycle square wave signal. This signal is provided in its true and complement form through inverters 202, 203, and 204, to electrodes 106a and 106b. Each electrode 106a, 106b forms one plate of a variable capacitor 205, 206 respectively. The other plate of capacitors 205 and 206 is formed by the polysilicon layer 107a of inertial mass member 107 which in turn is electrically connected to polysilicon beam 104. The signal on beam 104 represents a weighted sum of the true and complement clock signal where the weights are the relative capacitance values of capacitors 205 and 206. The signal from beam 104 is amplified by element 207. Capacitors 205 and 206 are typically on the order of ten's of picofarads or less. The amplifier 207 therefore must have a relatively high input impedance similar to that required by a microphone amplifier. The outgoing signal of amplifier 207 is fed to signal processor 208 where the peak to peak amplitude is measured and an output signal 210 is produced proportional to the peak to peak signal and, thus, to the inertial load. Signal processor 208 may produce an analog or a digital output signal 210.

If we apply the circuit of FIG. 4 to the example illustrated in FIG. 2, as the end 114b of the inertial mass member draws closer to the electrode 106b, the relative capacitance of capacitor 206 increases in comparison to the relative capacitance of capacitor 205. The beam 104 generates a signal representing the weighted sum of the true and complement clock signal. This signal is amplified by element 207, and the resulting square wave is measured by signal processor 208 to determine its peak to peak value. An output signal 210 is generated proportional to the peak to peak value and, thus, to the inertial load.

The movement of tilt sensor 100 is relatively stiff in the X, Y and Z directions and relatively soft in rotation about the axis of the beam. The stiffness in rotation may be affected by the width and thickness of the beam 104 as well as the length of the free region between where the beam 104 is bonded to the inertial mass member 107 and to the sacrificial layer 102 (essentially the substrate 101). Stiffness may also be affected by the stress in the polysilicon layer 103. Electrostatic forces applied as a result of the clock signals on the electrodes 106a and 106b can make the tilt sensor 100 unstable. It may be preferable to select a width of the tilt sensor 100 to be relatively small, to, for example, minimize the moment arm over which the electrostatic force is applied. In preferred embodiments, the width is in a range from about 50 microns to 200 microns. In addition, it may be desirable to engineer the capacitance of the tilt sensor 100 as relatively large; accordingly, the length of the sensor 100 should be relatively large. In preferred embodiments the length is in a range from about 250 microns to 1000 microns. It should be noted that the microphone and sensor assembly should not be limited to the above dimensions, which are provided merely for the purpose of example.

Figure 5:
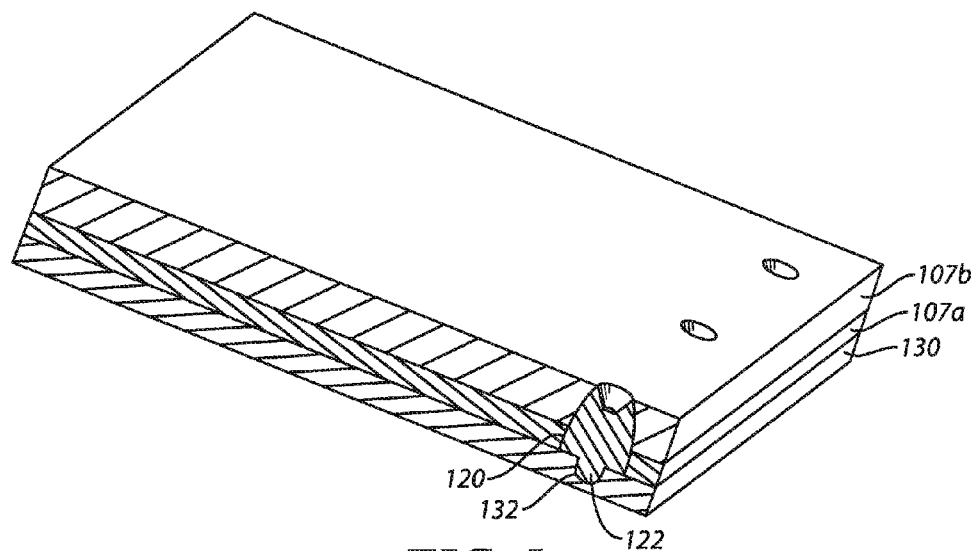
FIG. 5 illustrates a perspective view of a section of a portion of an inertial mass member in an embodiment of the present invention.

In some embodiments, the tilt sensor 100 may demonstrate instability. If driven too hard, the tilt sensor 100 may electrostatically collapse, causing inertial mass member 107 to touch either electrode 106a or electrode 106b. To avoid this condition, the features illustrated in FIG. 5 can be added to a peripheral edge of inertial mass member 107 to prevent it from coming in contact with electrodes 106a or 106b. More specifically, the tilt sensor 100 may have a hole 132 partially etched into a second sacrificial oxide layer 130. A hole 120 may be etched through the polysilicon layer 107a which is concentric with the partially etched hole 132 in a second sacrificial layer 130. A corresponding bump or raised portion 122 is thus formed in the silicon nitride layer 107b. The height of the bump is sufficient to prevent the polysilicon layer 107a from touching electrodes 106a or 106b. It may be of sufficient height such that the spring restoring force provided by beam 104 is greater than the electrostatic attraction force between the corresponding electrodes 106a and 106b and the inertial mass member 107. The result is a tilt senor 100 which is stable. Given the above constraints, someone skilled in the art can compute the various relative dimensions, stiffnesses, and voltages required for a given application to provide stability. In some embodiments, the height of the bump 122 is approximately one-third to one-half of the nominal spacing between the inertial mass member 107 and the electrodes 106a and 106b. In preferred embodiments, the spacing is in a range from about 2 microns to 4 microns. In preferred embodiments, the bump height is in a range from about 1 micron to 2 microns. Again, the microphone and sensor assembly should not be limited to these dimensions which are provided merely for example.

Figure 6:
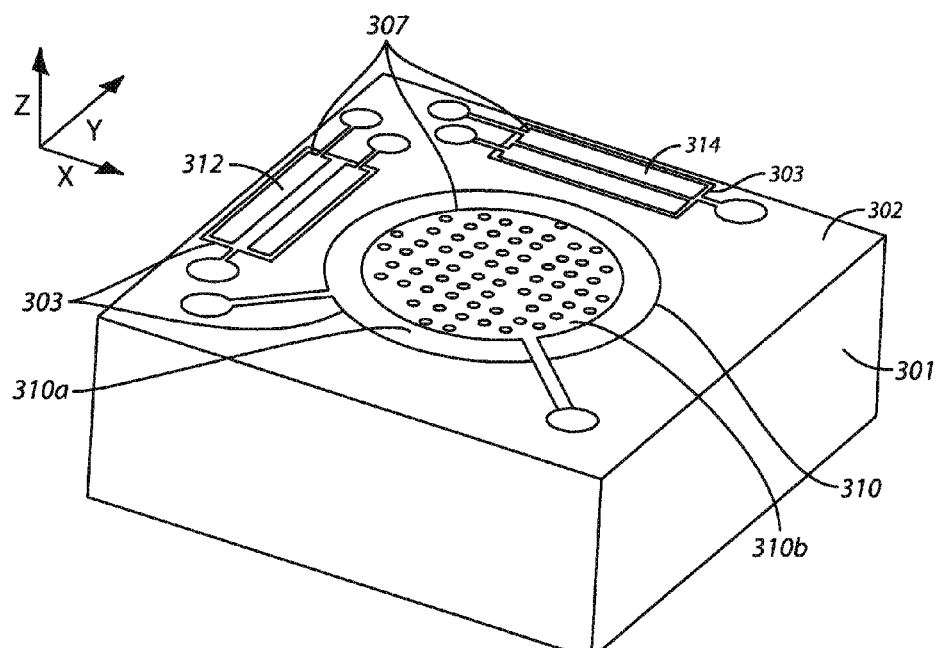
FIG. 6 illustrates a perspective view of a microphone and orientation sensor assembly in an embodiment of the present invention.

FIG. 6 shows an assembly 300 having two tilt sensors 312 and 314 integrated with a microphone 310 such as the microphone disclosed in the '460 patent. The two tilt sensors 312 and 314 are oriented so that, for example, tilt sensor 312 responds to inertial load in the X direction, or along an X-axis, and tilt sensor 314 responds to inertial load in the Y direction, or along a Y-axis. All three devices are built on the surface of a common substrate 301 which has a sacrificial oxide layer 302 on it. Polysilicon layer 303 which serves as the electrodes and beams of tilt sensors 312 and 314, also serves as the diaphragm 310a of the microphone 310. The sandwich 307 of polysilicon and silicon nitride layers serves as the perforated member 310b of microphone 310 as well as the inertial mass members of tilt sensors 312 and 314. In other embodiments, multiple tilt sensors can be placed in both physical and electrical parallel arrangements to increase the working capacitance.

Figure 7:
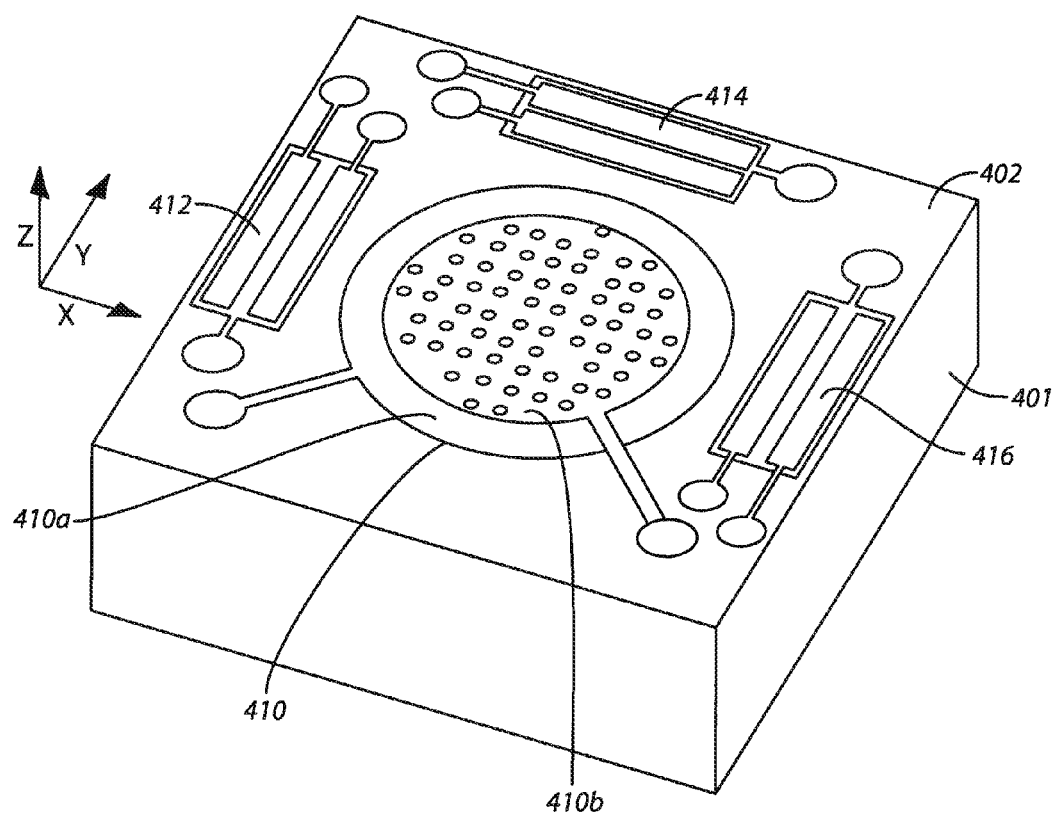
FIG. 7 illustrates a perspective view of a microphone and orientation sensor assembly having three orientation sensors in an embodiment of the present invention.

An integrated three axis tilt and microphone assembly 400 is depicted in FIG. 7, where relative to FIG. 6, like numerals refer to like parts. One tilt sensors, 416, may include an asymmetric mass to permit sensing inertial loads in the Z-axis or direction. Similar to the embodiment illustrated in FIG. 6, the polysilicon layer (comparable to 303 in FIG. 6) serves as the electrodes and beam of the tilt sensors 412, 414, 416 and also serves as a diaphragm 410a of microphone 410. A combination (comparable to 307 in FIG. 6) of polysilicon and silicon nitride layers serves as a perforated member 410b of microphone 410 as well as the inertial mass member of the tilt sensors 412, 414, and 416.

Figure 8:
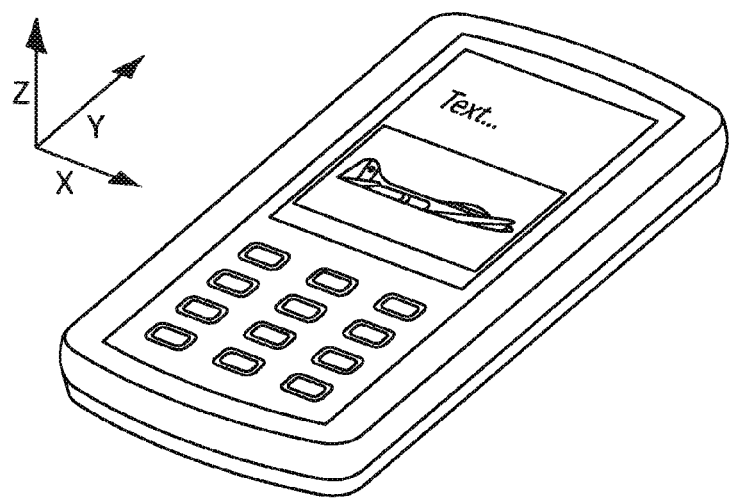
FIG. 8 illustrates a perspective view of a cellular device which utilizes a microphone and orientation sensor assembly in an embodiment of the present invention.
Figure 9:
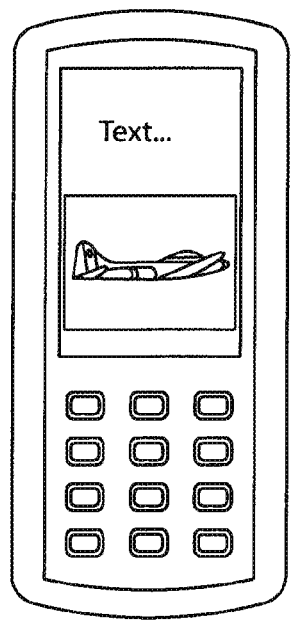
FIG. 9 illustrates the cellular device of FIG. 8 in a vertical position.
Figure 10:
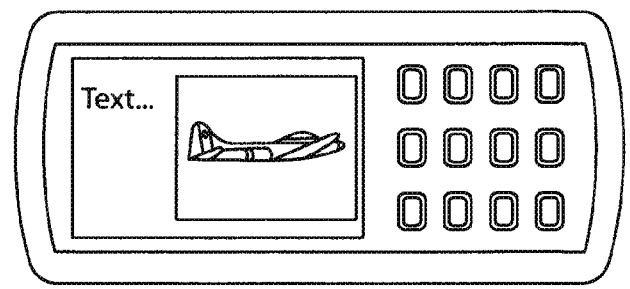
FIG. 10 illustrates the cellular device of FIG. 8 in a horizontal position.

In a typical application, such as a cell phone 500 shown in FIG. 8, an integrated microphone and dual axis tilt sensor chip of the present invention would be installed on an interior circuit board and oriented in the X-Y plane parallel to the display surface of the device. When the cell phone is tilted about either the X or Y axis, the respective output of the corresponding tilt sensor would change, due to the inertial load. The application program running in the cell phone, which is in connection with signals from the tilt sensors, would then rotate the information shown on the screen as depicted in FIG. 9 (vertical position) and FIG. 10 (horizontal position). Any hand held appliance with a display could take advantage of this functionality. Benefit would particularly arise when these appliances also include an audio feature that requires a microphone. Devices contemplated include, but are not limited to, personal music players, digital still cameras, digital video cameras, voice recorders, remote control units, and similar devices.

In applications such as digital cameras and cell phones which include image sensors, the output of an integrated microphone with dual axis tilt sensors could be used to influence how an image is stored or transmitted. Regardless of whether the image is in the classical portrait or landscape mode, the image would be able to be stored and/or transmitted in a heads-up format. This would eliminate having to rotate a picture after storage to see the images "right-side-up". The graphics processor within the application device would modify the file format based on the tilt sensor output to store the image right side up.

Tablet PC's have displays that can be rotated through a variety of configurations. The most common configurations include: clamshell and tablet mode. The microphone and orientation sensor assembly of the present invention can provide the appropriate microphone functionality while configuring the image and the image form factor (portrait vs. landscape) for the display usage. Specifically, the information could be automatically oriented for the tablet mode (i.e. portrait presentation) or the clamshell mode (landscape). In current hardware-software embodiments, the user needs to enter the software and select between portrait and landscape modes. The use of the orientation sensor would provide the required hardware information and permit information configuration automatically.

In notebook computers, accelerometers are often used for shutting down the hard drive during a rapid fall (i.e., device is dropped). The microphone and sensor assembly would permit notebooks to sense the configuration of the screen. In situations where the screen is oriented face down to the keyboard, the screen would be turned off. As a result, power would be saved and battery life would be extended.

For Global Positioning Satellite ("GPS") devices, east-west travel is best displayed in landscape mode. North-South travel is best displayed in portrait mode. "Best" means that the most relevant information is shown on the device. The combination of the microphone and orientation sensor assembly permits the following features (please note that this list is not dispositive of all potential features the microphone and sensor assembly may provide): The GPS device may tell the user to select the "best" orientation; the GPS device may confirm whether the user did make the "best" orientation selection; and the GPS device may recognize the orientation and display the information according to the user-chosen orientation.

Similarly, smart cards are used for security, point of purchase and a variety of other applications. Typically, smart cards need to be oriented in a specific manner to permit a reader access to the data on the smart card. A smart card incorporating or somehow associated with the present invention would be capable of informing the user via audio signal of a correct or incorrect orientation.

With respect to other important applications, having similar operational principles, the orientation sensor and microphone assembly could be incorporated into tools that require an auditory safety function.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A microphone and orientation sensor system comprising:
    a microphone having a diaphragm;
    an orientation sensor comprising:
        an inertial load member having a first end and a second end opposite the first end;
        at least one electrode positioned adjacent to the inertial load member; and
        a beam, wherein the inertial load member pivots about the beam, wherein the pivoting of the load member causes a change in a distance between the first end and the electrode resulting in a change in capacitance between the first end and the electrode;
    wherein the diaphragm and electrode are formed from a common layer of material.

2. The system of claim 1 wherein the inertial load member comprises a first layer of a first material and a second layer of a second and different material.

3. The system of claim 1 further comprising an additional mass member disposed upon a surface of the inertial load member.

4. The system of claim 3 wherein the additional mass member is disposed as to only one side of the surface of the inertial load member.

5. The system of claim 3 wherein the additional mass member comprises a wire bond metallization.

6. The system of claim 1 wherein the inertial load member comprises a first layer and a second layer, wherein the second layer comprises a raised portion extending through an opening in the first layer, and wherein the raised portion is operable to prevent contact between the first layer and the at least one electrode.

7. A microphone and orientation sensor system comprising:
    a microphone having a backplate;
    an orientation sensor comprising:
        an inertial load member having a first end and a second end opposite the first end; and
        a beam, wherein the inertial load member pivots about the beam;
    wherein the backplate and load member share a common layer of material.

8. The system of claim 7 wherein the inertial load member comprises a first layer of a first material and a second layer of a second and different material.

9. The system of claim 7 further comprising an additional mass member disposed upon a surface of the inertial load member.

10. The system of claim 9 wherein the additional mass member is disposed as to only one side of the surface of the inertial load member.

11. The system of claim 9 wherein the additional mass member comprises a wire bond metallization.

12. The system of claim 7 further comprising at least one electrode disposed adjacent to the inertial load member, and wherein the inertial load member comprises a first layer and a second layer, wherein the second layer comprises a raised portion extending through an opening in the first layer, and wherein the raised portion is operable to prevent contact between the first layer and the at least one electrode.

* * * * *